E. WICKS.
SEEDING MACHINE.
No. 7,227. Patented Mar. 26, 1850.
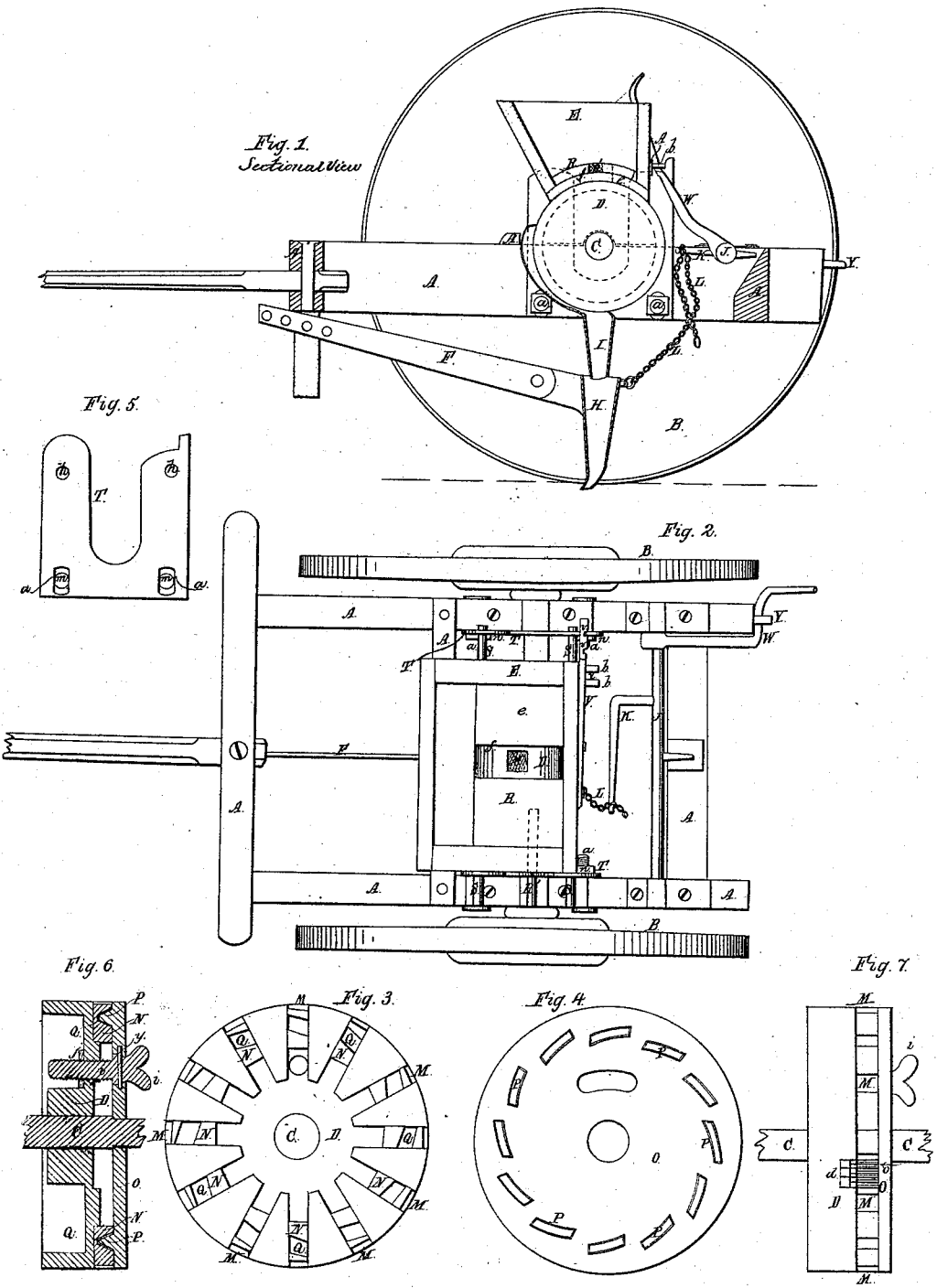

UNITED STATES PATENT OFFICE.

EDWARD WICKS, OF BART TOWNSHIP, LANCASTER COUNTY, PA.

IMPROVEMENT IN THE SEED-ROLLER OF A SEED-PLANTER.

Specification forming part of Letters Patent No. 7,227, dated March 26, 1850.

*To all whom it may concern:*

Be it known that I, EDWARD WICKS, of Bart township, Lancaster county, State of Pennsylvania, have invented certain new and useful Improvements in Seeding-Machines, which are described as follows, reference being had to the annexed drawings of the same, making part of this specification.

Figure 1 is a vertical longitudinal section of the machine. Fig. 2 is a top view of the machine. Fig. 3 is a vertical section of the seeding-cylinder. Fig. 4 is a plan of the circular plate, showing the circle of sections of male screws for matching with sections of female screws on the slides that form the movable bottoms of the apertures in the periphery of the seeding-cylinder. Fig. 5 is an elevation of one of the adjustable bearing-plates. Fig. 6 is a vertical section of the cylinder and plate; and Fig. 7 is a side view of the same, showing the scale and indicator.

Similar letters in the several figures refer to like parts.

The frame A, cart-wheels B B on the axle of the planting-cylinder D, hopper E, jointed beam F, hollow tooth or tubular drill H, conducting-spout I, rock-shaft J, lifting-arm K, and connecting-chains L, being made and arranged in the usual or most approved manner, need not therefore be particularly described.

The improvements that I have made relate to the following essential points: first, to a peculiar mode of constructing the seeding-cylinder so that all the apertures in its periphery can be enlarged or diminished simultaneously by simply turning a plate which lies against the end of the cylinder and is on the same axle; second, a novel mode of stopping and starting the seeding operation by moving the hopper to the right or to the left over the surface of the cylinder by the action of a bent lever; third, a new mode of compensating for the wear of the convex surface of the planting-cylinder and the concave surface of the hopper by arranging the adjustable bearings of the hopper in such manner that the hopper can be lowered vertically or moved horizontally forward or back or canted obliquely when required with very little difficulty for the purpose of a correct adjustment to the cylinder by simply unscrewing or screwing certain nuts or burrs which clamp said adjustable bearings or plates; fourth, in a novel mode of employing a spring-catch attached to the sliding hopper by which the hopper can be engaged with and disengaged from one of the adjustable bearings when the hopper is required to be moved to the right or to the left; fifth, in so constructing and arranging a lever as to perform the several offices of disengaging the spring-catch and moving the hopper, and also raising and suspending the tubular drills.

The planting or seeding cylinder D is made hollow, of any convenient size, and is perforated around its periphery with radial openings M, in which are placed slides N or blocks that close said openings when entirely extended, and which gradually open and enlarge the said openings as the said slides are drawn in toward the center by the circular plate O, with sections of screws P, so as to be adapted to the planting of any required quantity of seed to the acre, which will be ascertained from a scale, *d*, marked on the circumference of the cylinder, and an index or pointer, *o*, on the periphery of the plate. Each slide contains a section of a female screw, Q, into which matches a section of a male screw, P, formed on the inner side of the turning-plate. This plate O generally forms a continuation of the cylinder, its center being coincident with that of the cylinder D and made to turn with the axle C of the cart-wheels B, which passes through the cylinder D. To move the radial slides from the center in order to diminish the size of the seed-cups, the plate O must be turned to the right or to the left, according to the position or angle of the threads of the screws. To produce a contrary motion of the slides to increase their size, the plate O must be turned in a contrary direction. To hold the slides N (which form the bottoms of the seed-cups) in a given position, the wheel O must be clamped to the cylinder D, and this is effected by a thumb-screw, *i*, nut *j*, and washer *y*, or other suitable mechanical device.

The hopper E is made in the usual manner, except its bottom *e*, which is made convex on the surface inside the hopper, having an opening, *f*, in the same, through which the seed descends to the seed cups or cavities M in the peripheries of the cylinder, and which is opened or closed by means of a slide, R, arranged and operated in the bottom of the hopper.

To the bottom of the hopper are secured two parallel slides, S, of greater length than the hopper. These slides move back and forth in the openings $h$ of the bearing-plates T while moving the hopper. The plate T, forming the bearings of the hopper-slides S, are made of a form resembling the letter U, and are secured to the frame of the machine by means of screws $a$, which pass through the frame and through oblong mortises $m$ in said bearing-plates, having nuts $n$ screwed on them, by which they are clamped to the frame.

The spring-catch V, for securing the hopper to the bearing-plate, is fastened to the side of the hopper and has two notches, $v$, which allow of its becoming engaged with the bearing-plate T when the opening in the hopper is directly over the perforated or blank portion of the planting-cylinder; and the said spring V is also provided with a third notch, $x$, to admit the lever W, by which the spring V is disengaged from the plate T and the hopper E moved in the required direction. The last-named notch, $x$, may be made in the spring or it may be formed on it by means of two knobs or cogs, $b$ $b$, formed on its surface at a distance apart a little greater than the diameter of the lever to be inserted between them.

The lever W, which is to perform the several offices of raising and lowering the tubular drill-tooth H, disengaging the spring-catch V from the bearing-plates T, moving the hopper E to the right or to the left over and against the surface of the planting-cylinder D, in order to make the hopper act as a valve for stopping and starting the planting of the seed, is made in the form represented in Fig. 2. It is fixed to the shaft J, which serves as its fulcrum, so as to cause said shaft to turn on its axis alternately to the right and left.

The operation of this seeding-machine is somewhat similar to other seeding-machines in use. For instance, the seed to be planted is placed in the hopper E, the slide R drawn, and the horse or horses attached to the frame driven forward. The tubular drill H opens a furrow, into which the seed descends, passing first from the hopper into the cavities in the periphery of the cylinder, and carried round by said cylinder and discharged into the spout I, and conducted thence to the tubular tooth H, through which it passes into the furrow.

The operation of stopping the planting by the sliding of the hopper, so as to close the opening $f$ in the hopper by the convex surface of the cylinder, is effected by bringing the lever W against the spring-catch V and bearing it toward the hopper, which disengages it from the plate T, then, with the same lever still in contact with one of knobs or projections $b$ on the spring V, the hopper is moved to the position required. The same lever W is used to raise the tubular drill from the ground by depressing its longer arm, and thus turning the rock-shaft J from which the lifting-arm K extends. The hollow tooth H is held in its raised position by bringing the bent lever under a pin, Y, inserted into the frame. The manner of increasing or diminishing the sizes of the cells or cavities in the planting-cylinder having been described in giving a description, need not be repeated.

Having described the nature of my invention and improvement and its several modes of operation, what I claim as my invention, and desire to secure by Letters Patent, is—

The before-described mode of constructing the planting-cylinder D, by which the cavities or cells M in the periphery are enlarged or diminished simultaneously by simply turning the plate O or other similar device, having its sections P of male screws on its inner face and causing said sections to act on all of the radial slides Q, forming the bottoms of the cavities at the same time, and holding them firmly in the required positions by the thumb-screw $i$, or other equivalent mechanical device, substantially as aforesaid, by which like results are produced.

In testimony whereof I have hereunto signed my name before two subscribing witnesses.

EDWARD WICKS.

Witnesses:
LUND WASHINGTON,
WM. P. ELLIOT.